United States Patent [19]

Kramer

[11] Patent Number: 4,753,353

[45] Date of Patent: Jun. 28, 1988

[54] CONVEYING DEVICE

[75] Inventor: Walter Kramer, Cham, Switzerland

[73] Assignee: Motan Plast-Automation AG, Cham, Switzerland

[21] Appl. No.: 867,132

[22] Filed: May 27, 1986

[30] Foreign Application Priority Data

May 24, 1985 [EP] European Pat. Off. ......... 85/106432

[51] Int. Cl.$^4$ .......................... B07C 5/00; B07C 5/344
[52] U.S. Cl. .................................... 209/570; 209/656; 209/906; 406/156
[58] Field of Search ............... 209/567, 570, 571, 656, 209/657, 906; 406/156, 161, 183

[56] References Cited

U.S. PATENT DOCUMENTS

| 3,279,861 | 10/1966 | Hubbard | 406/156 |
| 4,171,262 | 10/1979 | Lattmann et al. | 209/657 |
| 4,344,843 | 8/1982 | Leifeld | 406/156 |
| 4,480,753 | 11/1984 | Thomas et al. | 209/657 |

FOREIGN PATENT DOCUMENTS

| 0145374 | 10/1980 | Fed. Rep. of Germany | 209/570 |
| 3323162 | 1/1985 | Fed. Rep. of Germany | 209/570 |
| 0766827 | 10/1980 | U.S.S.R. | 209/567 |
| 0893748 | 12/1981 | U.S.S.R. | 406/183 |

Primary Examiner—Robert B. Reeves
Assistant Examiner—Donald T. Hajec
Attorney, Agent, or Firm—Foley & Lardner, Schwartz, Jeffery, Schwaab, Mack, Blumenthal & Evans

[57] ABSTRACT

A conveying device (1) for granular material (2) to be transported has a conveying line (3) which is connected to a suction appliance (7). Along the conveying line (3) is an induction coil (8), which is connected to a control device (10) for a discharge flap (13). By means of the latter, metal particles (2') are separated from the material (2) via a discharge opening (23). The discharge flap (13) and the discharge opening (23) lie inside a separator container (9') of a metal separator (9) through which runs the conveying line (3). The conveying line (3) also has inside the separator container (9') an inflow opening (31) through which the air passing into the container (9') during separation of the metal particles (2') can flow back into the conveying line (3). Since the separator container (9') is directly connected to the conveying line (3), a bypass line can be dispensed with so that a simple and inexpensive line guidance is achieved. Futhermore, the discharge flap (13) does not need to be sealed, and a high conveying capacity and consequently a high efficiency of the device (1) is ensured.

24 Claims, 5 Drawing Sheets

CONVEYING DEVICE

BACKGROUND OF THE INVENTION

The present invention relates to a conveying device for an essentially granular material, and more especially to such a device having a conveying line connected to a conveying appliance for transporting using a conveying medium, in particular a suctionconveying or compressed air conveying system. The device also has a metal separator with an induction coil, a control device and a descharge flap connected to the conveying line, for selectively opening and closing a discharge opening for granular material which is contaminated with metal particles.

A conveying device of this type is known from German Offenlegungsschrift No. 3,323,162. In this conveying device, the separator container is installed into a bypass line which is connected to the suction appliance. The discharge flap is directly connected to the bypass line and sealed against this line. The separator container consists of a cover part and a lower part which are separated by a filter which prevents the separated metal particles from being able to pass into the cover part and via the latter into the conveying line.

SUMMARY OF THE INVENTION

It is therefore an object of the present invention to provide an improved conveying device.

It is a particular object of the invention to provide a conveying device of the above-described type in which the contruction is simplified so that a smaller space requirement is necessary and the sealing of the discharge flap is dispensed with.

In accomplishing the foregoing objects, there has been provided according to the present invention a conveying device for essentially granular material, comprising a conveying conduit; means, connectd with the conduit, for transporting granular material through the conduit by means of a transporting medium; means, associated with the conduit and including an induction coil, for selectively discharging granular material from an intermediate point in the conduit in response to detection of metal particles in granular material flowing through the conduit; and a separator container for receiving metal particle-containing granular material discharged from the conduit at the intermediate point, wherein the conveying conduit passes through the separator container, the intermediate point for discharge of metal particle-containing granular material lies within the separator container, and the conveying conduit includes means, within the separator container, for defining at least one opening for return into the conduit of transporting medium which has been discharged into the separator container.

According to various embodiments of the invention, the means for selectively discharging material comprises: a discharge flap for selectively opening and closing an opening in the conduit; a flexible conduit piece attached to one end of either a first or second conduit part which form a gap within the separator container; or a portion of one conduit part or a separator discharge piece of tubular shape, which can be pivoted out of the longitudinal axis of the conveying conduit.

Further objects, features and advantages of the invention will be apparent from the detailed description of preferred embodiments which follows and the drawings.

DETAILED DESCRIPTION OF PREFERRED EMBODIMENTS

As a result of the design according to the invention, the separator container is directly integrated into the conveying line, so that a bypass line can be dispensed with. This ensures a simple and inexpensive line orientation. Since the discharge flap and the discharge opening lie in the separator container, the discharge flap does not need to be sealed. Furthermore, a filter can be dispensed with in a two-piece container, so that manufacturing and assembly costs can be reduced. Above all, however, a high conveying output and therefore a high efficiency of the device according to the invention are guaranteed. The impurities to be separated can be removed over the shortest paths and in correspondingly shorter time, so that the transport of the remaining material to be transported is thereby not significantly interrupted. Consequently, the device according to the invention guarantees maximum conveying output in an exceptionally simple design. This device is also substantially less susceptible to failure, because no sealing problems occur. Thus, the requisite vacuum can no longer be lost when using a suction-conveying appliance.

The invention is described in greater detail below with reference to several exemplary embodiments shown in the drawings.

Figure 1:
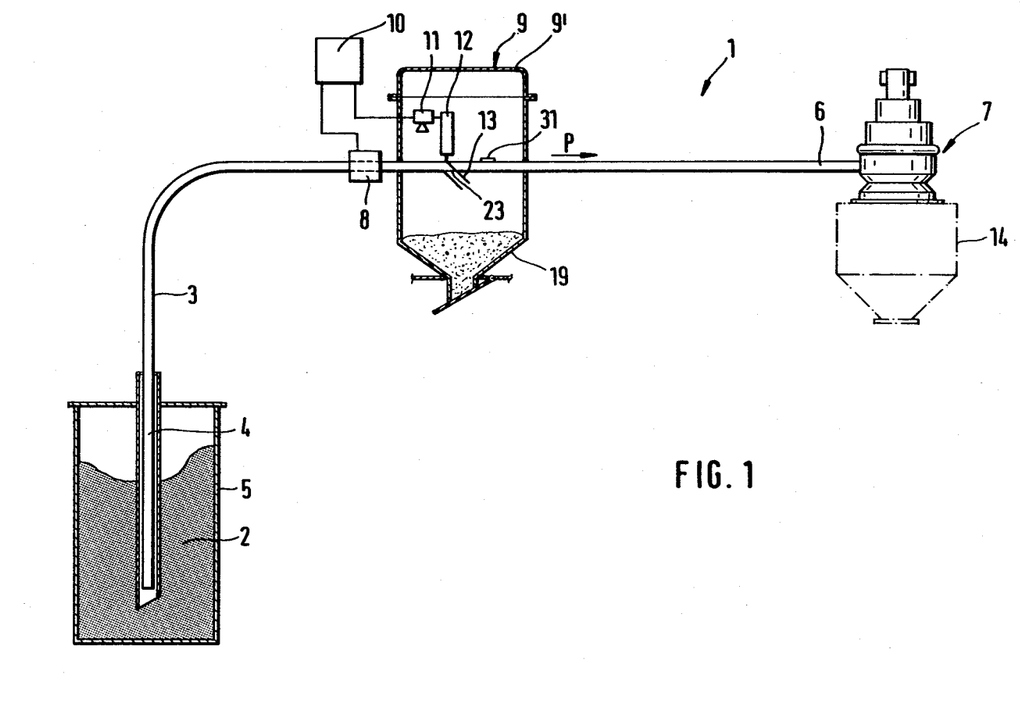
FIG. 1 is a schematic view of a conveying device according to the invention, having a conveying line which is guided through a separator container of a metal separator and which has a discharge flap.
Figure 2:
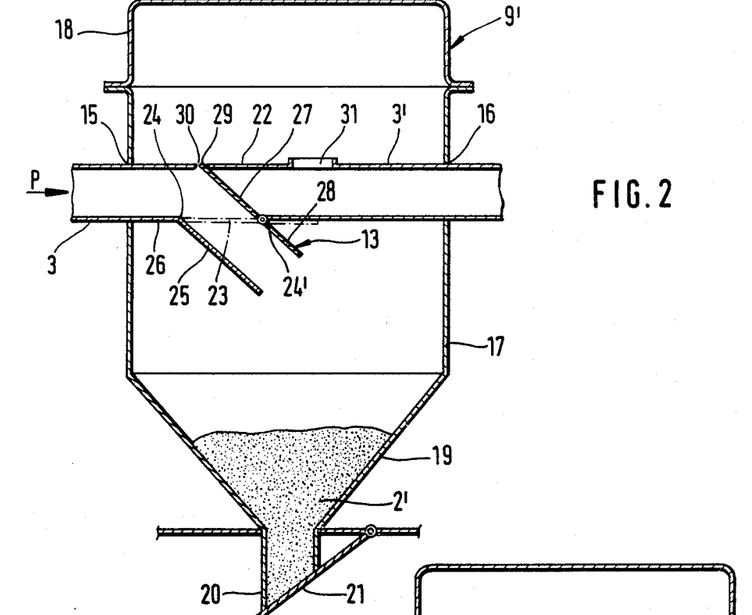
FIG. 2 is a schematic cross-sectional view of the separator container according to FIG. 1, with the conveying line in enlarged representation.

The conveying device 1 according to FIG. 1 is used for drawing off granular material 2 to be transported, such as, for example, plastic granules, glass, rice, flour, sugar or other non-metallic materials. The conveying device 1 has a conveying line 3 which, with one end 4, projects into a supply container 5 containing the material 2 to be transported and, with its other end 6, is connected to a suction appliance 7. Between the ends 4 and 6, an induction coil 8 of a metal separator 9 is connected to the conveying line 3. The purpose of the metal separator 9 is to make it possible to remove metallic impurities 2' contained in the material 2 to be transported (FIG. 2).

Furthermore, the metal separator 9 consists of a control device 10, electrically or electronically connected to the induction coil, a solenoid valve 11, a positioning member 12 for a discharge flap 13 connected to the conveying line 3, and also a separator container 9'.

The positioning member 12 is preferably disigned as a piston-cylinder device and is connected to the discharge flap 13. When the stream of material to be transported which flows past in the area of the induction coil 8 contains metal particles, the induction coil is excited, as a result of which it transmits a signal to the control device 10. The solenoid valve 11 is consequently actuated via the control device 10, which solenoid valve 11 acts on the positioning member 12. By the actuation of the positioning member, the discharge flap is displaced such that the conveying line 3 is interrupted in the transporting direction P and the flow of material 2 to be transported is deflected laterally in such a way that it is discharged into the separator container 9'. The stream of material to be transported which is contaminated with metal particles can thereby be separated and removed in simple manner from the remaining flow of material to be transported, so that the material to be transported which is collected in a collecting container 14 connected to the suction appliance 7 is completely purified, that is, it no longer contains any metal particles. After the contaminated material to be transported has been separated in the manner described above, the discharge flap 13 automatically closes discharge opening 23 in the conveying line 3, preferably by a specified timing pulse, while it swings back into a release position with respect to the transported stream of material to be transported. In this release position it again cancels the interruption of the conveying line 3. The stream of material can then be transported further in the transporting direction P to the collecting container 14.

To be able to draw off satisfactorily via the suction unit 7 the material 2 to be transported, the separator container 9' is made vacuum tight according to conventional techniques, with passage openings 15 and 16 (FIG. 2) for the conveying line 3, and also lower part 17 and cover part 18 of the separator container 9' being sealed via seals (not shown).

As shown by FIG. 2, the conveying line 3 is guided through the lower part of the container 17, which is preferably substantially higher than the cover part 18. Furthermore, the lower part of the container has a funnel-shaped end portion 19 which leads into an outlet connecting piece 20 which can be closed by flap 21.

According to FIG. 2, the pipe portion 22 of the conveying line 3 which lies in the separator container 9' has the discharge opening 23 which leads downward into the separator container and through which the contaminated material 2 to be conveyed is separated. Adjoining the upstream edge 24 of the discharge opening 23 is a deflection plate 25 which projects downwardly at an obtuse angle to the longitudinal axis of the conveying line 3. On the opposite opening edge 24' is articulated flap 13 which consists of a double-arm sheet-metal strip. One flap arm 27, which closes the cross-section of line 3 in the closed position of the discharge flap 13, is longer than the other flap arm 28. In the release position (dash-dotted lines in FIG. 2), the flap arm 27 extends over the entire length of the discharge opening 23 and closes it, while the other flap arm 28 bears against the underside 26 of the conveying line 3. In the closed position of the discharge flap, the free end 29 of the flap arm 27 projects through a narrow transverse slot 30 in the wall of the conveying line 3. The transverse slot 30 runs perpendicular to the transporting direction P and is of a length which is only slightly larger than the width of the discharge flap 13 or its arm 27. As a result of the transverse slot 30, neither the material 2' to be transported which is contaminated with metal particles nor metal particles themselves can become jammed between the free end 29 of the flap arm 27 and the pipe wall of the conveying line 3 in the closed position of the discharge flap 30. This prevents the possibility that such material could again pass into the stream of material to be transported when the discharge flap is opened and then pass unimpaired into the collecting container 14. In the transporting direction P, an air inflow opening 31 is provided downstream of the discharge flap in the conveying line 3. This air inflow opening 31 is preferably provided in the upper pipe wall half 3' facing toward the cover part 18. Suction air can flow back out of the separator container 9' into the conveying line 3 via the air inflow opening 31. When the contaminated flow of material to be transported is cut off, this suction air flows into the separator container 9', in which it rises upward as shown in FIG. 3 in dash-dotted lines and then escapes via the opening 31 out of the separator container into the conveying line 3, where it flows further in the transporting direction P.

The discharge flap 13 does not need to be sealed relative to the conveying line 3, because the same pressure conditions prevail within the separator container 9' as in the conveying line 3. According to an alternative embodiment, the conveying line 3' can also be guided through the cover part 18, so that a larger collecting space for the contaminated material to be transported is readily available. Instead of the suction appliance 7 (FIG. 1), a compressed-air supply device can also be provided, so that the material to be transported can be transported into the collecting chamber with compressed air in the direction P. In this case, the metal separator 9 is arranged with the discharge flap in the conveying line 3—as in the embodiment according to FIG. 2—and is made in a similar manner. In such a device, an air inflow opening corresponding to the opening 31 is again provided in the conveying line 3, via which the compressed air can flow back out of the separator container into the covneying line.

The positioning element for manipulating the discharge flap 13, in addition to being formed in this embodiment by the piston-cylinder device, can also be formed, for example, by known rotary magnets, diaphragm cylinders or similar devices. During vacuum operation or suction conveying, as achieved with the suction appliance 7 according to FIG. 1, the discharge flap 13 is closed by the prevailing vacuum, whereas it has to be closed against the excess pressure prevailing in the separator container if compressed air is employed during transport of the material. For example, rotary magnets, piston-cylinder device and the like are again suitable as positioning elements for this purpose. As soon as the discharge flap 13 has been swivelled into the closed position via the control device 10, the solenoid valve 11 and the positioning member 12, the subsequent stream of material 2' to be transported is deflected at the discharge flap, so that it is discharged out of the conveying line 3 through the discharge opening 23 and is guided along the deflection plate 25 and the flap arm 28 into the separator container 9'.

Figure 3:
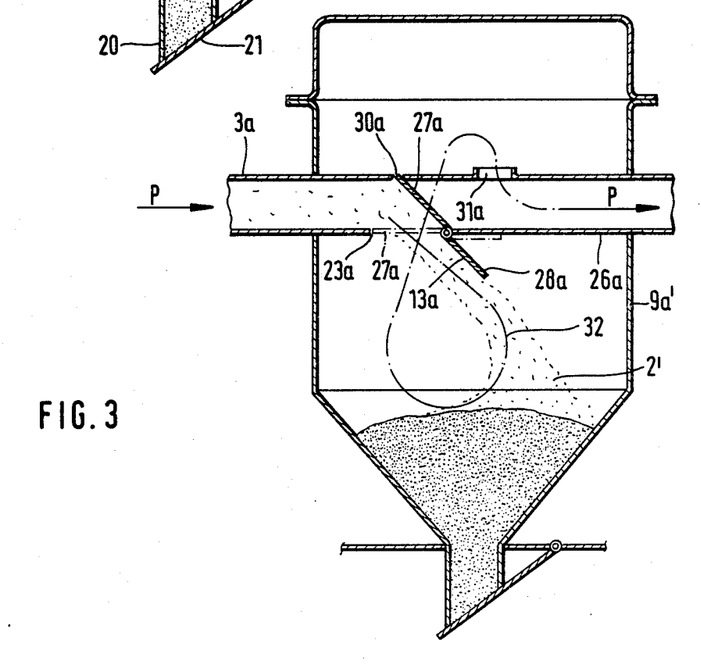
FIGS. 3-9 in each case show another embodiment of the metal separator in representation similar to FIG. 2.

The embodiment according to FIG. 3 differs from the embodiment described above only in that no deflection plate is provided and that the flap arms 27a and 28a of the discharge flap 13a lie in different planes. The conveying line 3a consequently has only the lower discharge opening 23a, the opening 30a and the upper air inlet opening 31a. In the release position, the flap arm 27a closes the discharge opening 23a, whereas in the closed position it closes the flow cross-section of the conveying line 3a. As in the above exemplary embodiment, the other flap arm 28a, in the release position, acts as a stop for the discharge flap and, in the closed position of the latter, as a deflection part for the deflected material to be transported. The contaminated material $2\alpha$ to be transported falls downwardly from the discharge opening 23a (the straight portion of the dash-dotted path 32), it being deflected at the lower flap arm 28a. The air passing into the separator container 9a' with this stream of material then flows upwardly with the dash-dotted path 32 and is returned downwardly above the conveying line 3a. It passes into the air inlet opening 31a and flows further in the transporting direction P in the conveying line to the suction appliance and the collecting container. The flap arms 27a and 28a lie in planes which are parallel to one another and which are offset relative to one another by a distance approximately equal to the thickness of the pipe wall, so that the flap arm 27a, in the release position of the discharge flap 13a (dotted lines in FIG. 3) is in alignment with the underside 26a of the pipe wall.

Figures 4, 5:
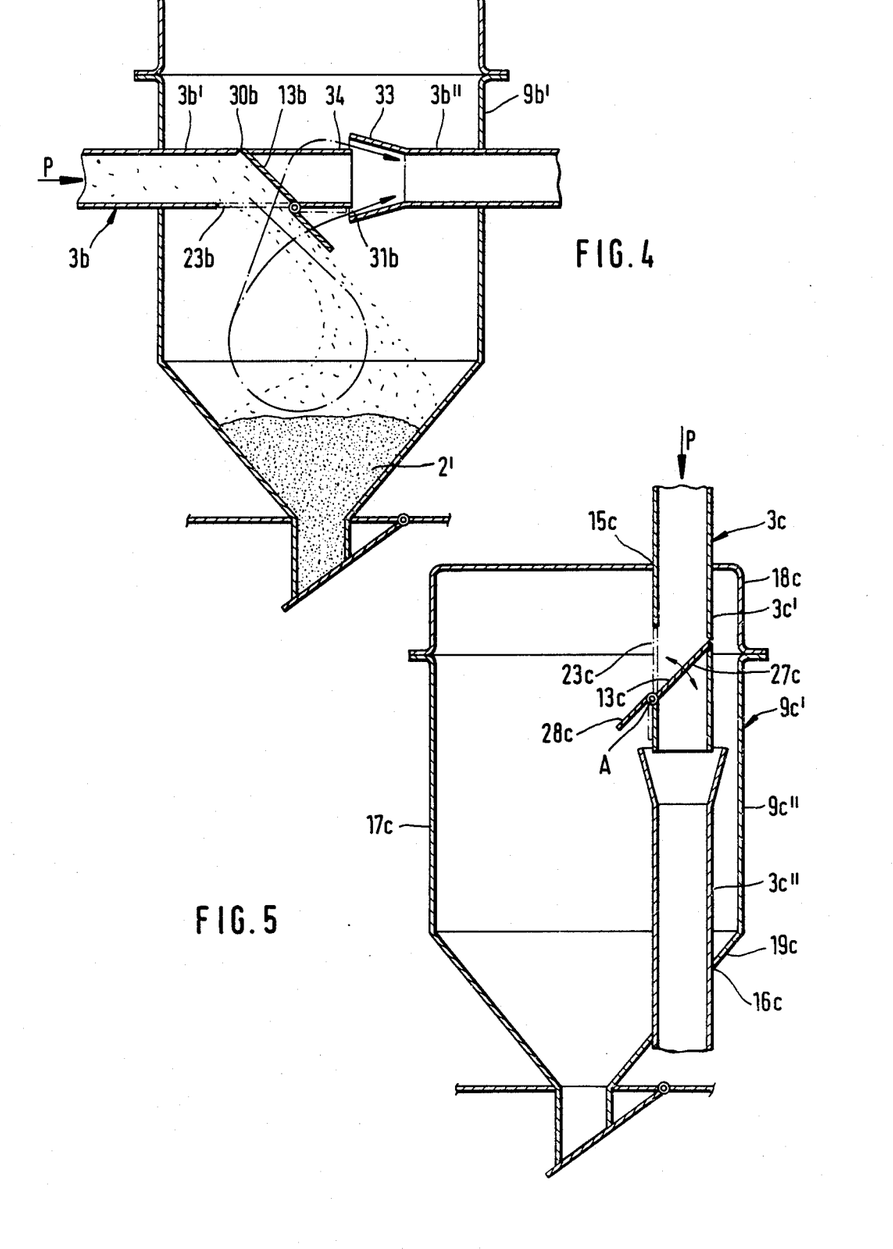

The conveying devie 1b according to FIG. 4 differs from the previous exemplary embodiment in that the air inlet opening 31b is not formed by a slot or similar penetration in the upper part of the pipe wall but by an annular gap between two pipe parts 3b' and 3b''. In this embodiment, the conveying line 3b is formed by the two pipe parts which are located one behind the other at a slight distance inside the separator container 9b '. The first pipe part 3b ', which is upstream in the transporting direction P, has the discharge opening 23b, the oppositely located transverse slot 30b and the discharge flap 13b, which is of the same design as in the embodiment of FIG. 3. The upstream end 33 of the second pipe part 3b'' is conically widened, so that the annual gap 31b remains between this pipe end 33 and the end 34 of the first pipe part 3b, and this annular gap 31b forms the air inflow opening. However, the gap must not be too large, so that no particles of the material to be transported can fall through the gap. When there is a small gap, the particles will be pulled along with the material to be transported as a result of their inertia, so that they pass over the gap and into the second pipe part 3b '. In this connection, there is an advantageous check in that the pipe end 33 is widened in the opposite direction to the transporting direction P, so that the risk of material particles passing outwardly through the annular gap 31b is additionally reduced.

The air contained in the separator container 9b' can enter via the annular gap 31b into the second conveying pipe part 3b'' and then flow further in the transporting direction P (dash-dotted lines in FIG. 4). This embodiment can be made simply and cost effectivley, in that it is unnecessary to provide a slot which has to be subsequently cut into the line.

In the embodiment according to FIG. 5, the conveying line 3c is arranged vertically in the separator container 9c '. It runs parallel to the container axis and adjacent to a longitudinal side wall 9c'' of the separator container. Otherwise, however, this embodiment corresponds to the embodiment according to FIG. 4.

The first pipe part 3c' projects through an opening 15c in the cover part 18c, whereas the second pipe part 3c'' is guided through an opening 16c in the funnel-shaped end portion 19c of the separator container 9c '. The first pipe part is arranged in such a way that the pivot axis A of the discharge flap 13c lies slightly below the connecting plane of the container parts 17c and 18c, so that a relatively large space is available for accommodating in the separator container 9c' the material which is to be separated.

The vertical installation position of the conveying line 3c has the advantage that the metal particles to be separated can be separated particularly simply and effectively while utilizing their gravitational force. In the closed position shown of the discharge flap 13c, the metal particles first fall onto the flap arm 27c located in the conveying line 3c and then slide on it through the discharge opening 23c and outwardly via the second flap arm 28c until they finally fall down freely in the separator container 9c '.

Figures 6, 7:
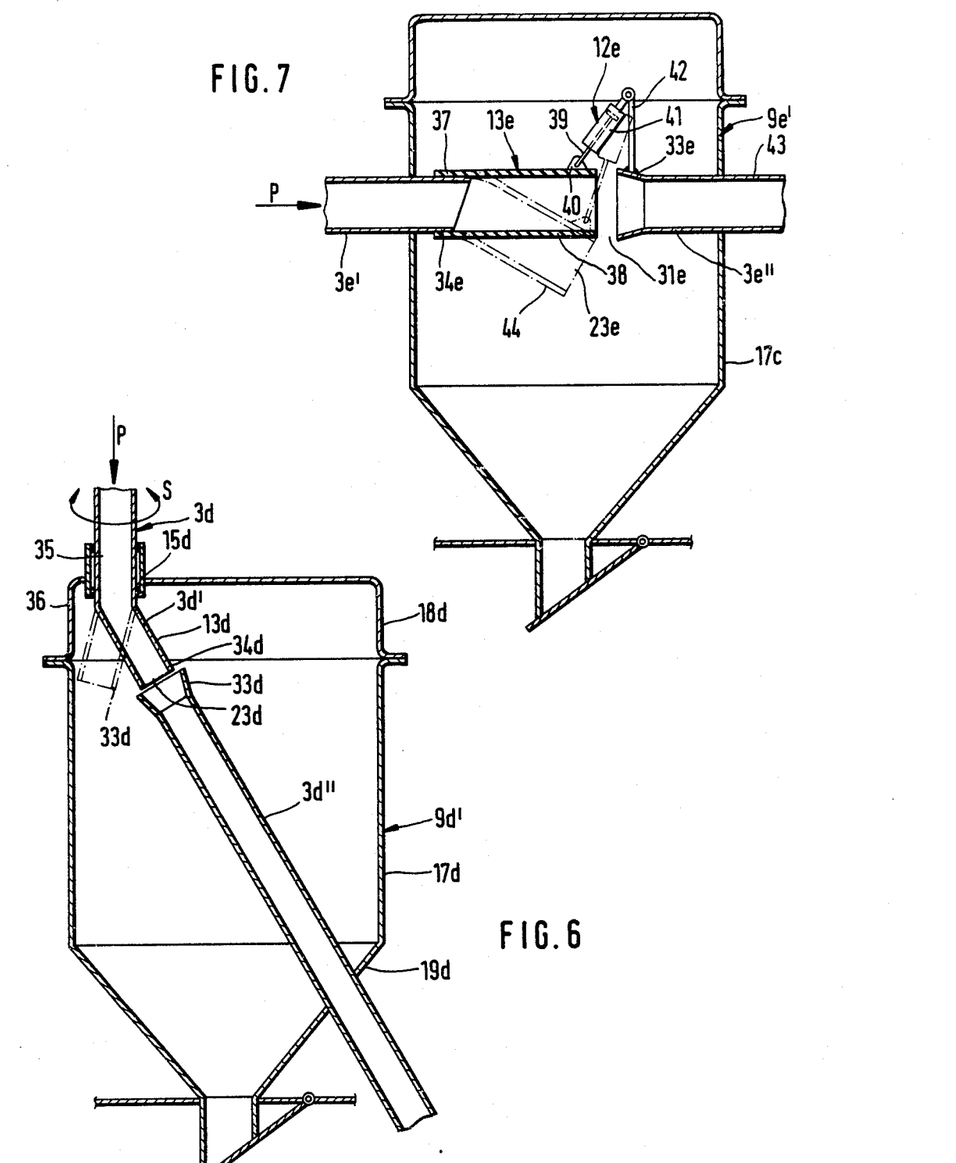

In a similar manner, the metal particles in the embodiment according to FIG. 6 are also separated under the effect of gravitational force, because here the conveying line 3d is likewise guided downwardly from above into the separator container 9d '. It again enters into the cover part 18d and emerges at the end portion 19d of the container part 17d, with the difference that the conveying line 3d runs at an angel inside the separator container 9d' preferably from one side to the opposite side. The first pipe part 3d'' is made as an angle pipe or a pipe elbow which is rotatably held with its one angle piece 35 in the opening 15d of the cover part 18d. The other pipe part 13d forms the discharge flap and lies fully inside the separator container 9d' or its cover part 18d. Its free end 34d, which forms the discharge opening 23d, lies approximately at the level of the connecting plane between the over part and the lower part 18d and 17d. The second tube part 3d'' with the conical end 13d projects substantially further into the separator container 9d' approximately as far as the level of the connecting plane between the cover part and the lower part.

The angle piece 35 is arranged at such a distance from the edge 36 of the cover part 17d that, for separting the metal particles, it can be turned relative to the conveying position shown, to such an extent to one side or the other (arrow S) that its free end 33d lies outside an imaginary extension of the second pipe part 3d'' and then assumes the position indicated by dotted lines. This ensures that the metal particles can fall down freely into the separator container 9d without the risk of passing into the second pipe part 3d '. This embodiment is of very simple construction and is inexpensive, because the discharge flap is formed by the available first pipe part 3d' itself; that is, a separate discharge flap and therfore separate manufacture and assembly are dispensed with. As in the embodiment described above, the pipe end 33d of the second pipe part 3d'' widens in the opposite direction to the transporting direction P.

Figure 8:
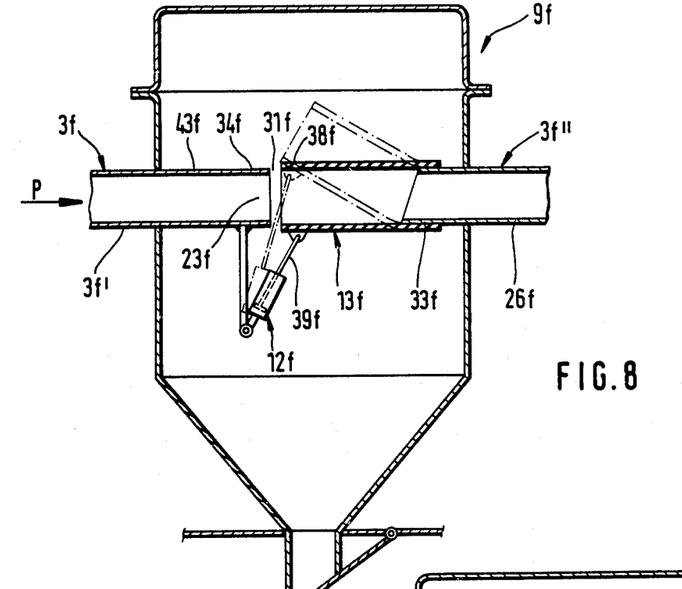
Figure 9:
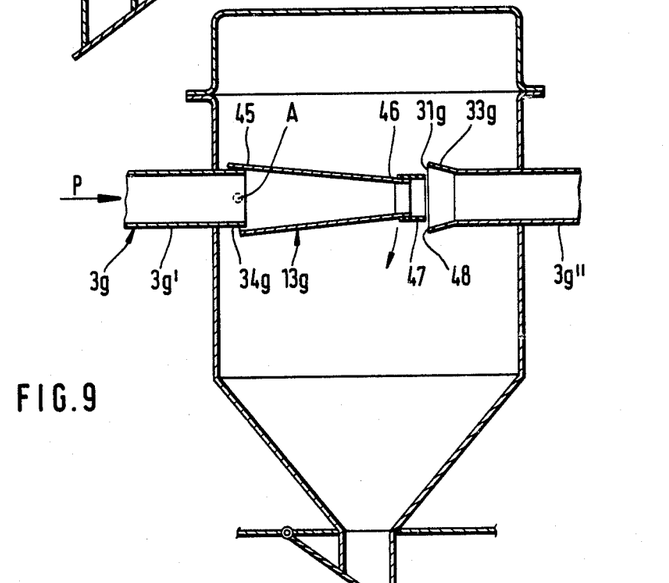

The embodiments according to FIGS. 7 to 9 largely correspond to the embodiment according to FIG. 4, with the difference that their discharge flaps 13e to 13g consits of a flexible pipe piece which is fixed on one of the pipe parts 3e ', 3f''or 3g '.

According to FIG. 7 the discharge flap 13e is a hose piece which, with its rear end 37, is fitted onto the downstream end 34e of pipe part 3e '. In the release position (solid lines), the discharge flap 13 lies coaxial to the first pipe part 3e '. As in the embodiment described above according to FIG. 6, its downstream end 38 lies at a slight axial distance from the adjacent end 33e of the second pipe part 3e'', which is conically widened in the opposite direction to the transporting direction P. Consequently, the discharge flap 13e , without butting against the second pipe part 3e'', can be pressed into the closed position shown in dotted lines. The distance of the flap end 38 from the pipe end 33e is preferably greater than the diameter of the largest material particle which can be expected, so as to avoid jamming of the particles in the annular gap 31e between the ends 38 and 33e. Furthermore, the annular gap 31e has the advantage that the air passing into the separator container during the deflection of the metal particles can escape via the annular gap 31e, flowing into the second pipe part 3e". The positioning member 12e is preferably designed as a piston-cylinder device which has the free end of the piston rod 39 articulated on an articulation bracket 40 or the like of the discharge flap 13e. Its cylinder 41 is articulated on a rod 42 or a similar retaining member, which is fixed, preferably welded, in an upright position on the rear conical end 33e of the second pipe part 3e".

As in the embodiment according to FIG. 4, the horizontal conveying line 3e lies in the lower part of the container 17e. The positioning member 12e is preferably fixed on the upper side 43 of the first and second pipe parts 3e' and 3e". When the induction coil (FIG. 1) is excited, the positioning member 12e is actuated via the control device 10, and its piston rod 39 is extended. The discharge flap 13e is thereby elastically bent downwardly into the position shown in dotted lines. In this position, the discharge opening 23e formed by the free end 44 of discharge flap 13e lies below the end 33e of the second pipe part 3e", so that the material to be separated can fall down freely into the separator container 9e'.

The embodiment according to FIG. 8 differs from the exemplary embodiment described immediately above only in that the discharge flap 13f is secured onto the second pipe part 3f", the rear end 33f of which is not widened conically but has the same size opening as the remaining pipe part. The air inlet opening 31f is formed by the annular gap between the free ends 34f and 34f of the first pipe part 3f and the discharge flap 13f. Furthermore, the positioning member 12f is not articulated on the upper side 34f but on the underside 26f of the pipe parts 3f' and 3f". The discharge flap 13f is thereby bent elastically upwardly into the closed position shown in dotted lines when the piston rod 39f of the positioning part 12f is extended.

The embodiments according to FIGS. 7 and 8 have the advantage that they are of very simple construction and are inexpensive, because no deflection plate is necessary. The discharge flap need only be pushed on, that is, it need not be articulated, and in addition, it is a simple, inexpensive component.

Furthermore, in the embodiment according to FIG. 8, the conical pipe end is dispensed with, so that the design of this metal separator 9f is simplified even further. In the closed position of the discharge flap 13f, the material to be transported falls downwardly via the discharge opening or the downstream opening 23f of the first pipe part 3f', into the separator container 9f, while the air which passes at the same time into the separator container flows back into the conveying line 3f via the discharge flap 13f. The discharge flap 13f is therefore used not only for separating metal particles but also as an inflow connecting piece via which the air contained in the separator container can flow back into the conveying line 3f. These designs are also suitable for vertical installation in the separator container.

In the embodiment according to FIG. 9, the discharge flap 13g again consists of a flexible pipe piece which is not only loosely fitted onto one of the pipe parts 3g' and 3g" but is pivotably articulated on the first pipe part 3g' about a fixed axis A. The discharge flap 13g is of conical disign. Its pipe end 45 which is widened in the direction opposite to the transporting direction P extends over the associated end 34g of the first pipe part 3g', whereas the other (downstream) pipe end 46 has a substantially smaller inside diameter and is at a distance from the adjacent conical end 33g of the second pipe part 3g". A flexible, short hose piece 47 is fitted onto the pipe end 46. This hose piece 47, in the release position shown of the discharge flap 13g, extends into the vicinity of a plane containing the upstream side 48 of the second pipe part 3g". Consequently, the annular gap 31g between the discharge flap 13g and the second pipe part 3g" is bridged, so that material particles to be transported cannot unintentionally fall downwardly out of the conveying line 3g during transport to the collecting container 14 (FIG. 1).

What is claimed is:

1. A conveying device for essentially granular material, comprising:
   a conveying conduit comprising a first upstream conduit part and a second downstream conduit part separated by an axial gap;
   means, connected with said conduit, for transporting granular material through said conduit by means of a transporting medium;
   means, associated with said conduit and including an induction coil, for selectively discharging granular material from an intermediate point in said conduit in response to detection of metal particles in granular material flowing through said conduit;
   a separtor container for receiving metal particle-containing granular material discharged from said conduit at said intermediate point,
   wherein said conveying conduit passes through said separator container, said intermediate point for discharge of metal particle-containing granular material lies within said separator container, and said conveying conduit includes means, within said separator container, for defining at least one opening for return into said conduit of transporting medium which has been selectively discharged with said metal particle-containing granular material into said separator container, said one opening comprising said axial gap and said axial gap being at a point within said separator container.

2. A device as claimed in claim 1, wherein the upstream end of said second conduit part comprises a funnel shape.

3. A device as claimed in claim 1, wherein the first conduit part comprises an angled conduit, a first let of which is rotatably held in the cover part of the separator container.

4. A device as claimed in claim 3, wherein said means for selectively discharging granular material includes a second leg of said angled conduit.

5. A device as claimed in claim 1, wherein said means for selectively discharging granular material includes a flexible conduit piece attached at said gap to an end of one of said conduit parts.

6. A device as claimed in claim 5, wherein said flexible conduit piece is attached to the first conduit part.

7. A device as claimed in claim 5, wherein said flexible conduit piece is attached to the second conduit part.

8. A device as claimed in claim 5, wherein said at least one opening is formed by a narrow, axial gap between said flexible conduit piece and the conduit part located opposite.

9. A device as claimed in claim 5, wherein the second conduit part has the same inside diameter over its entire length.

10. A device as claimed in claim 5, further comprising a retaining member fixed on the free end of the conduit part to which said flexible conduit piece is not attached, and a positioning member connected between said retaining member and said flexible conduit piece.

11. A device as claimed in claim 10, wherein the positioning member is located on an underside of the conveying conduit.

12. A device as claimed in claim 1, wherein said means for selectively discharging granular material comprises a discharge piece pivotably fixed on one of said conduit parts.

13. A device as claimed in claim 12, wherein the discharge piece comprises a conical member which narrows in a direction corresponding to transport of granular material.

14. A device as claimed in claim 13, further comprising a flexible conduit piece attached to the free end of the discharge piece.

15. A device as claimed in claim 14, wherein said at least one opening is formed between the free end of the flexible conduit piece and the opposite end of the second conduit part which is flared outwardly.

16. A conveying device for essentially granular material, comprising:
a conveying conduit;
means, connected with said conduit, for transporting granular material through said conduit by means of a transporting medium;
means, associated with said conduit and including an induction coil, for selectively discharging granular material from an intermediate point in said conduit in response to detection of metal particles in granular material flowing through said conduit, said slective discharging means being movable between an open conduit position in which granular material is not discharged from said intermediate point and a discharge position in which granular material and transporting medium are selectively discharged from said intermediate point;
a separator container for receiving metal particle containing granular material discharged from said conduit at said intermediate point, said separator container surrounding said conduit on each side of said intermediate point and having a discharge axis; and
means within said separator container for substantially equalizing the pressure conditions within said conduit and said separator container, said pressure equalizing means comprising a first opening between said conduit and the separator container, whereby said selective discharge means does not have to be sealed relative to the conduit.

17. A device as claimed in claim 16, wherein said means for selectively discharging material comprises a discharge flap for selectively opening and closing a second opening in said conduit, and means, including a solenoid positioned inside of said separator container, for opening and closing said discharge flap in response to signals generated by said induction coil.

18. A device as claimed in claim 17, wherein said opening and closing means further comprises a positioning member located inside the separator container.

19. A device claimed in claim 16, wherein said one opening comprises a slot in the wall of the conveying conduit.

20. A device as claimed in claim 16, wherein the conveying conduit runs transversely to the discharge axis of the separator container.

21. A device as claimed in claim 16, wherein the separator container comprises a lower part and a cover part, and wherein the conveying conduit passes through the lower part.

22. A device as claimed in claim 21, wherein the conveying conduit in the separator container runs at an angle to the axis of the separator container.

23. A device as claimed in claim 22, wherein the conveying conduit enters the separator container through the cover part and exits from the lower part of the container.

24. A device as claimed in claim 16, wherein the transporting medium comprises air.

* * * * *